No. 809,762. PATENTED JAN. 9, 1906.
G. S. TIFFANY.
TELAUTOGRAPHIC AND OTHER ELECTRIC CIRCUITS.
APPLICATION FILED APR. 22, 1901.
2 SHEETS—SHEET 1.
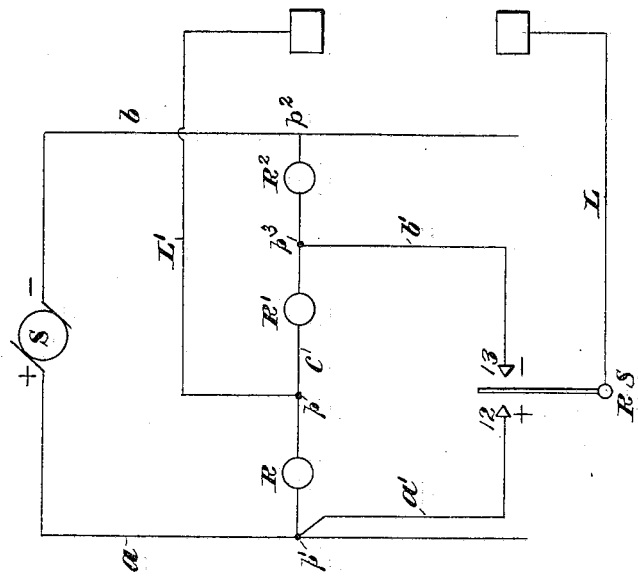
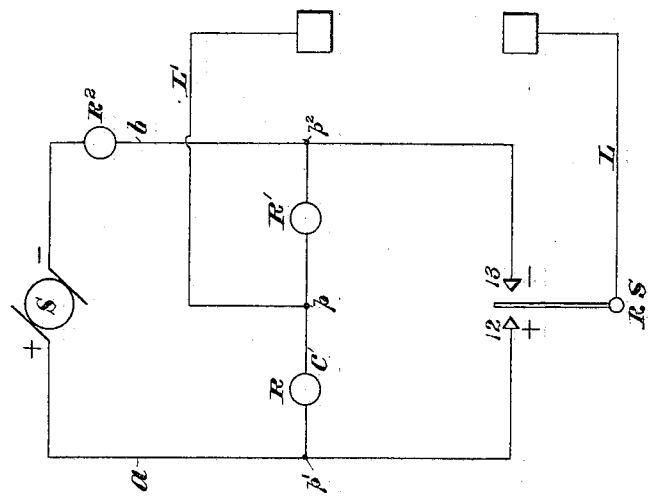
Attest:
J. A. Graves.
A. V. Bourke
Inventor:
George S Tiffany
by
Philipp Sanger Rice & Kennedy
Attys

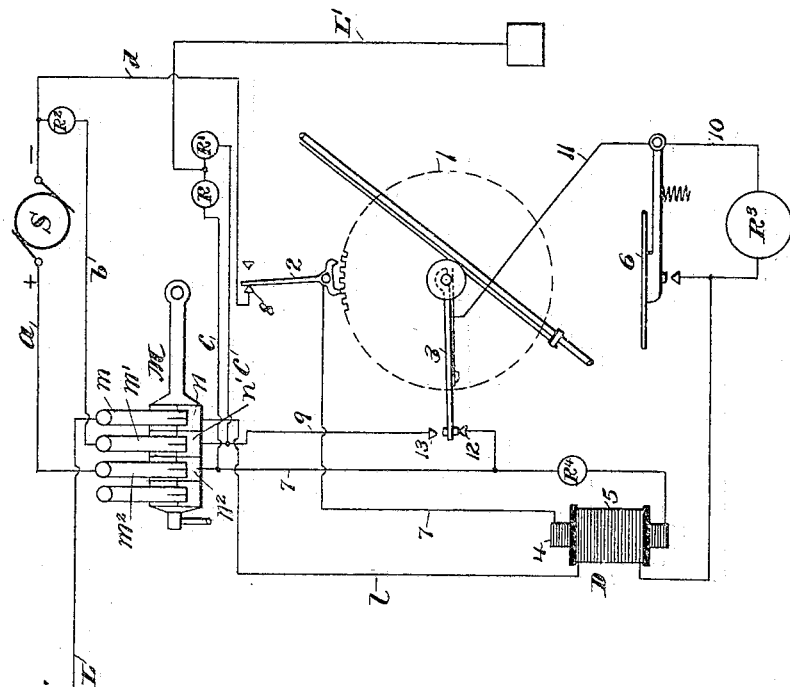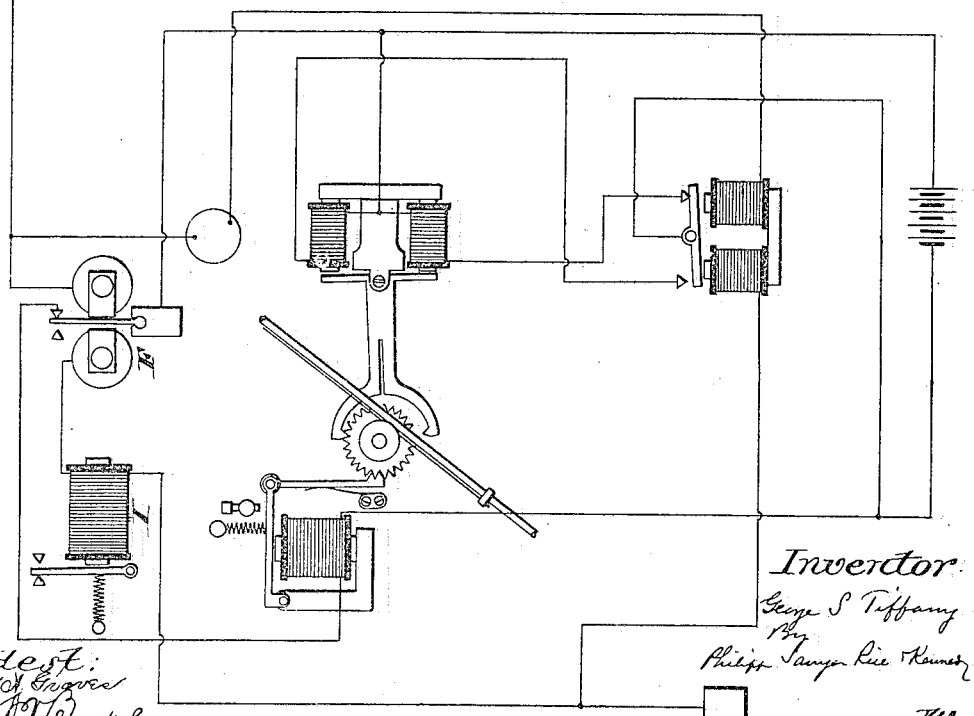

UNITED STATES PATENT OFFICE.

GEORGE S. TIFFANY, OF NEW YORK, N. Y., ASSIGNOR TO THE GRAY NATIONAL TELAUTOGRAPH COMPANY, OF NEW YORK, N. Y., A CORPORATION OF VIRGINIA.

TELAUTOGRAPHIC AND OTHER ELECTRIC CIRCUITS.

No. 809,762.             Specification of Letters Patent.        Patented Jan. 9, 1906.

Application filed April 22, 1901. Serial No. 56,811.

*To all whom it may concern:*

Be it known that I, GEORGE S. TIFFANY, a citizen of the United States, residing at New York city, county of Kings, and State of New York, have invented certain new and useful Improvements in Telautographic and other Electric Circuits, fully described and represented in the following specification and the accompanying drawings, forming a part of the same.

This invention aims generally to provide an arrangement of electrical circuits whereby a reversible current may be obtained from a source of electricity supplying a unidirectional current—that is, a current flowing only in one direction.

The invention has been made especially with the idea of supplying an operating-current for telautographs.

Heretofore a split storage battery which is a source of electrical energy capable of supplying currents flowing in both directions has been usually employed for operating the telautograph; but its first cost and expense of maintenance make it desirable to provide a substitute.

My present invention enables the reversible currents required for operating the telautograph to be obtained from a source of electricity supplying a unidirectional current and makes it possible to operate the telautograph from the direct-current circuits now generally employed for lighting or other purposes.

In the accompanying drawings, Figure 1 is a diagram of a simple arrangement of circuits, illustrating the invention. Fig. 2 is a diagram of circuits when the current is to be obtained from the supply-mains of a distribution circuit or system. Fig. 3 is a diagram of circuits, illustrating the application of the invention to a telautograph.

Referring first to Fig. 1, S represents a direct-current dynamo or other source of electricity having positive and negative poles from which wires $a$ and $b$ connect to the contacts 12 and 13 of a reversing-switch or pole-changer RS, and to this reversing-switch is connected one leg L of the main or line circuit. The other leg L' of the main circuit connects at $p$ to a shunt $c$, which connects the poles of the dynamo, as by connecting with the wires $a$ and $b$ at points $p'$ and $p^2$. This shunt is provided with a resistance on each side of the point $p$, as indicated at R and R'. Such being the arrangement, a positive or negative current will be sent over the line L, according as the reversing-switch makes contact through 12 or 13. When the switch rests against contact 12, the line-circuit is completed as follows: Starting from the positive pole of the dynamo, through wire $a$, contact 12, switch RS, wire L, wire L', shunt $c$ through resistance R' and wire $b$ to the negative pole of the dynamo. If the switch rests against the contact 13, the line-circuit will be from the negative pole of the dynamo through wire $b$, contact 13, switch RS, wire L, wire L', shunt $c$ through resistance R, and wire $a$ to the positive pole of the dynamo. An adjusting-resistance $R^2$ may be introduced into either of the wires $a$ or $b$ between the point $p'$ or $p^2$, as the case may be, and the dynamo.

In Fig. 2 the wires $a$ and $b$ represent the mains of a direct-current distribution-circuit supplied by the dynamo S. The shunt $c$ connects to the two mains at points $p'$ and $p^2$ and to the leg of the main circuit at $p$ and has the resistances R and R', one on each side of the point $p$, as before, and the adjusting resistance $R^2$ is also placed in the shunt $c$, as shown, the resistances R R' and $R^2$ being thus in series across the mains $a$ and $b$. Connection to the contacts 12 and 13 of the reversing-switch is by wires $a'$ and $b'$, the wire $a'$ being in connection with the positive main $a$, as by connecting to the point $p'$, and the wire $b'$ connecting to the shunt at point $p^3$ between the resistances R' and $R^2$. Of course the wire $a'$ would be equally in connection with the main whether it connect with the main directly or with the shunt $c$ beyond the resistance R. As before, a positive or negative current will be sent over the line L, according as the reversing-switch connects with contact 12 or 13. When the switch rests against contact 12, the line-circuit will be from the positive pole of the dynamo through wire $a$, wire $a'$, contact 12, switch RS, wire L, wire L', shunt $c$, through resistances R' and $R^2$, and wire $b$ to the negative pole of the dynamo. When the switch rests against contact 13, the line-circuit will be completed from the negative pole of the dynamo through wire $b$, shunt $c$, through resistance $R^2$, wire $b'$, contact 13, switch RS, wire L, wire L', shunt $c$, through resistance R and wire $a$ to the positive pole of the dynamo. By making the resistances R and R' equal the positive and negative currents sent over the line will be equal, and the amount of the resistances R, R', and $R^2$ and their relation to each other will depend on the voltage of the current supplied, the resistance of the line, and the current desired on the line. For any given difference of potential between the points $p'$ and $p^2$ in Fig. 2 or between the point $p'$ and the negative pole of the dynamo in Fig. 1 the electromotive force of the current sent over the line L L' is determined by the relation of the joint resistance of one of the resistances R R' and the line L L', on the one hand, and the other of the resistances R R' and the adjusting resistance $R^2$, on the other hand. As an example, a one-hundred-and-ten-volt current being supplied, twenty-five-volt positive and negative currents will be sent over a line L L' of three hundred ohms resistance if the resistances R and R' are each of fifty ohms and the resistance $R^2$ of ninety-seven ohms. The use of resistance $R^2$ is of advantage, in that it provides a convenient way of adjusting the current sent over the line L L' and enables lower resistances R and R' to be used and a more constant electromotive force to be maintained on the line in case the line resistance is variable. It also avoids danger of short-circuiting through the switch RS.

In Fig. 3 I have shown my invention applied to a telautograph, such as is shown and fully described in my Patent No. 672,629, dated April 23, 1901. As usual in describing organizations of telautographic instruments, I have shown a single line-wire with its connections which provide for transmitting the movements of the transmitting-pen in one of its two crosswise directions of movement and the reversal thereof. It will be understood, however, that the complete instrument includes a second line-wire with a duplicate of the connections shown herein, whereby is provided means for transmitting the movements of the transmitting-pen in the other of its two crosswise directions of movement with the reversal thereof. As here shown, the usual interrupter-disk, rotating in one direction or the other, according to the direction of movement of the transmitting-pen, is shown at 1, the interrupter at 2, and the Prony brake at 3. D is an induction-coil having primary winding 4 and secondary winding 5. The usual writing-platen is shown at 6 with pen-lifting resistance $R^3$. The operating-current is supplied by the dynamo S or other source of electricity having positive and negative poles from which wires $a$ and $b$ connect with the contact-springs $m^2$ and $m'$ of the master-switch M. The contact-plate $n^2$ of the master-switch corresponding to the contact-spring $m^2$ is connected by wire 7 with the primary winding 4 of the induction-coil and with the interrupter 2, and when the interrupter rests against contact 8 circuit is completed through wire $d$ to the dynamo. The main line L connects with the contact-spring $m$ of the master-switch and thence through contact-plate $n$ and wire $l$ through the secondary winding 5 of the induction-coil to the resistance $R^3$ and thence by wires 10 and 11 to the Prony brake 3 and one or other of contact-stops 12 and 13, which contacts are respectively connected to the contact-plates $n^2$ and $n'$ of the master-switch by wires 7 and 9. The wires 7 and 9, leading from the contact-plates $n^2$ and $n'$, respectively, are connected by the shunt $c$, having the resistances R and R' and which is tapped between the resistances R and R' by the common return L'. When the writing-platen is depressed, the resistance $R^3$ is short-circuited. The adjusting resistance $R^2$, if provided, is conveniently introduced into the wire $b$. Suitable resistance $R^4$ may be introduced in the wire 7 beyond the point of connection therewith of the contact 12 for reducing the strength of the current passing through the primary winding 4 of the induction-coil. The vibrations of the interrupter 2 will thus cause successive makes and breaks in the circuit of the primary winding of the induction-coil, thus producing to-and-fro reverse currents of momentary duration on line. The windings of the induction-coil are so related to each other that these induced currents are of high tension. There will also be sent to line from the dynamo S a constant current, the strength of which is varied by the resistance $R^3$, according to the position of the platen 6 and the polarity of which depends upon the contact of Prony brake 3 with one or other of the stops 12 13. This constant current will be of comparatively low tension. The movements of the transmitting-pen in extent therefore result in sending to line a series of to-and-fro pulsations of relatively high tension, while the reversal of direction of movement of the transmitting-pen results in changing the polarity of the low-tension current constantly on line, and the depression of the platen increases this current by cutting out the resistance $R^3$.

The arrangement and operation of the receiving instrument here shown is as described in my said Patent No. 672,629 and need not be described herein, as it forms no part of the present invention and is shown merely for the purpose of making a complete showing of the application of the invention to a telautograph.

Referring now more particularly to the arrangement of circuits whereby the constant low-tension current of the line is reversed, when the Prony brake rests against the contact 12 a current of positive polarity is delivered to line, the line-circuit being as follows: Starting from the positive pole of the dynamo, by wire $a$ to contact-spring $m^2$ and contact-plate $n^2$ of the master-switch, thence by wire 7 to contact 12, Prony brake 3, wire 11 to platen 6, (or wire 10 and resistance $R^3$,) thence by wire $l$ through secondary winding of the induction-coil D to contact-plate $n$ and contact-spring $m$ to line L, and return by wire L' to shunt $c$ through resistance R' to wire 9, to contact-plate $n'$, and contact-spring $m'$, and by wire $b$ back to the negative pole of the dynamo. When the Prony brake rests against the contact 13, a current of negative polarity will be sent to line, the line-circuit being closed as follows: Starting from the negative pole of the dynamo by wire $b$ to contact-spring $m'$ and contact-plate $n'$, thence by wire 9 to contact 13, Prony brake 3, wire 11, to platen 6, (or wire 10 and resistance $R^3$,) thence by wire $l$ through the secondary winding of the induction-coil D to contact-plate $n$ and contact $m$ to line L, and returning by line L' to shunt $c$ through resistance R to wire 7, to contact-plate $n^2$, and contact-spring $m^2$, and thence by wire $a$ to the positive pole of the dynamo.

The proper relative adjustment of the various resistances, induction-coil, and magnets will be understood by those skilled in the art from the foregoing description. As an example, for a one-hundred-and-ten-volt current supplied by the source of electricity S a suitable adjustment for the organization shown is one in which the resistances R and R' are of fifty ohms each, the resistance $R^2$ ninety-seven ohms, the resistance of the primary and secondary windings of the induction-coil D forty and seventy-five ohms, respectively, resistance $R^4$ two hundred and fifty ohms, and resistance $R^3$ seven hundred ohms, the resistance of the line L being supposed to be of one hundred and forty-five ohms and the reversing-relay F and pen-lifting relay I of the receiver each having a resistance of forty ohms, making a total line resistance of three hundred ohms when the resistance $R^3$ is cut out. It will be understood that this adjustment may be widely varied.

It will be understood, of course, that in the application of my present invention to the telautograph I do not wish to be limited to the organization and arrangement of circuits shown herein.

What I claim is—

1. The combination of a source of electrical energy, a reversing-switch, the contacts of which are in connection with the positive and negative poles of the source of electrical energy, a shunt forming a connection between the poles of the source of electrical energy, a circuit connecting to the reversing-switch and to said shunt, said shunt having a resistance on each side of its point of connection to said circuit, and an adjusting resistance between one of the poles of the source of electrical energy and the point of connection of the shunt and the reversing-switch to the line leading to said pole, substantially as described.

2. The combination of a source of electrical energy, positive and negative mains leading therefrom, a shunt connecting said mains having three resistances R, R' and $R^2$ arranged in series therein, a reversing-switch one contact of which is in connection with the shunt between two of said resistances, R' and $R^2$, and the other contact of which is in connection with the main with which the shunt connects beyond the remaining resistance, R, and a circuit connecting to the reversing-switch and to the shunt between the resistance R and the intermediate resistance R', substantially as described.

3. In a telautographic transmitter, the combination with a current-reversing switch connected to an operating-circuit and means for throwing said switch in accordance with the movement of the transmitting-pen, of two conducting members adapted to be in connection with positive and negative poles respectively of a source of electrical energy and with which members the contacts of the reversing-switch are in connection, a shunt connecting said members, and a return from said operating-circuit connecting to said shunt, said shunt having a resistance on each side of its point of connection to said return, substantially as described.

4. In a telautographic transmitter, the combination with a current-reversing switch connected to line and means for throwing said switch in accordance with the direction of movement of the transmitting-pen, of two conducting members adapted to be in connection with positive and negative poles respectively of a source of electrical energy and with which members the contacts of the reversing-switch are in connection, a shunt connecting said members, and a return from line connecting to said shunt, said shunt having a resistance on each side of its point of connection to said return, substantially as described.

5. In a telautographic transmitter, the combination of means for sending to line to-and-fro impulses of high electromotive force corresponding in number with the movement in extent of the transmitting-pen, and means for sending to line a current of low electromotive force corresponding in polarity with the direction of movement of the transmitting-pen, said last-mentioned means comprising a reversing-switch connected to line, means for throwing said switch in accordance with the direction of movement of the transmitting-pen, two conducting members adapted to be in connection with positive and negative poles of a source of electrical energy and with which members the contacts of the reversing-switch are in connection, a shunt connecting said members, and a return from line connecting to said shunt, said shunt having a resistance on each side of its point of connection to said return, substantially as described.

6. In a telautographic apparatus, the combination of a circuit including a source of electrical energy capable of supplying only a unidirectional current, a line-circuit, and means for shunting into said line-circuit from the first said circuit currents of either positive or negative polarity, substantially as described.

In testimony whereof I have hereunto set my hand in the presence of two subscribing witnesses.

GEORGE S. TIFFANY.

Witnesses:
A. L. KENT,
A. A. V. BOURKE.